United States Patent [19]
Kennedy et al.

[11] 3,750,245
[45] Aug. 7, 1973

[54] TURRET LATHE

[75] Inventors: Edwin K. Kennedy, West Hartford; Richard I. Latzko, Glastonbury, both of Conn.

[73] Assignee: Pratt & Whitney, Inc., West Hartford, Conn.

[22] Filed: Sept. 21, 1971

[21] Appl. No.: 182,388

[52] U.S. Cl. .................. 29/39, 29/27 R, 82/24, 82/36 A
[51] Int. Cl. ................................ B23b 3/18
[58] Field of Search ............... 29/39, 47, 27 C, 29/52, 54, 27 R; 408/35, 23, 24; 82/4 A, 36 A, 24

[56] References Cited
UNITED STATES PATENTS
| | | | |
|---|---|---|---|
| 3,124,985 | 3/1964 | Curtis et al. | 29/39 X |
| 2,324,603 | 7/1943 | Strobl | 82/36 A |
| 3,486,209 | 12/1969 | Shultz et al. | 82/36 A X |

*Primary Examiner*—Gil Weidenfeld
*Attorney*—Radford W. Luther

[57] ABSTRACT

A lathe has a square turret with two tools orthogonally arranged on each turret face such that one tool is mounted in perpendicular relationship to the turret face, and the other tool is mounted in parallel relationship to the turret face. The turret is rotatable to four index positions and is movable along two axes. The tools, which are mounted perpendicular to the respective turret faces, are adapted to perform boring operations on a workpiece, and the tools, which are mounted in parallel relationship to the respective turret faces are adapted for turning and/or facing operations. When utilizing the four index positions of the turret, eight tool positions are possible.

3 Claims, 3 Drawing Figures

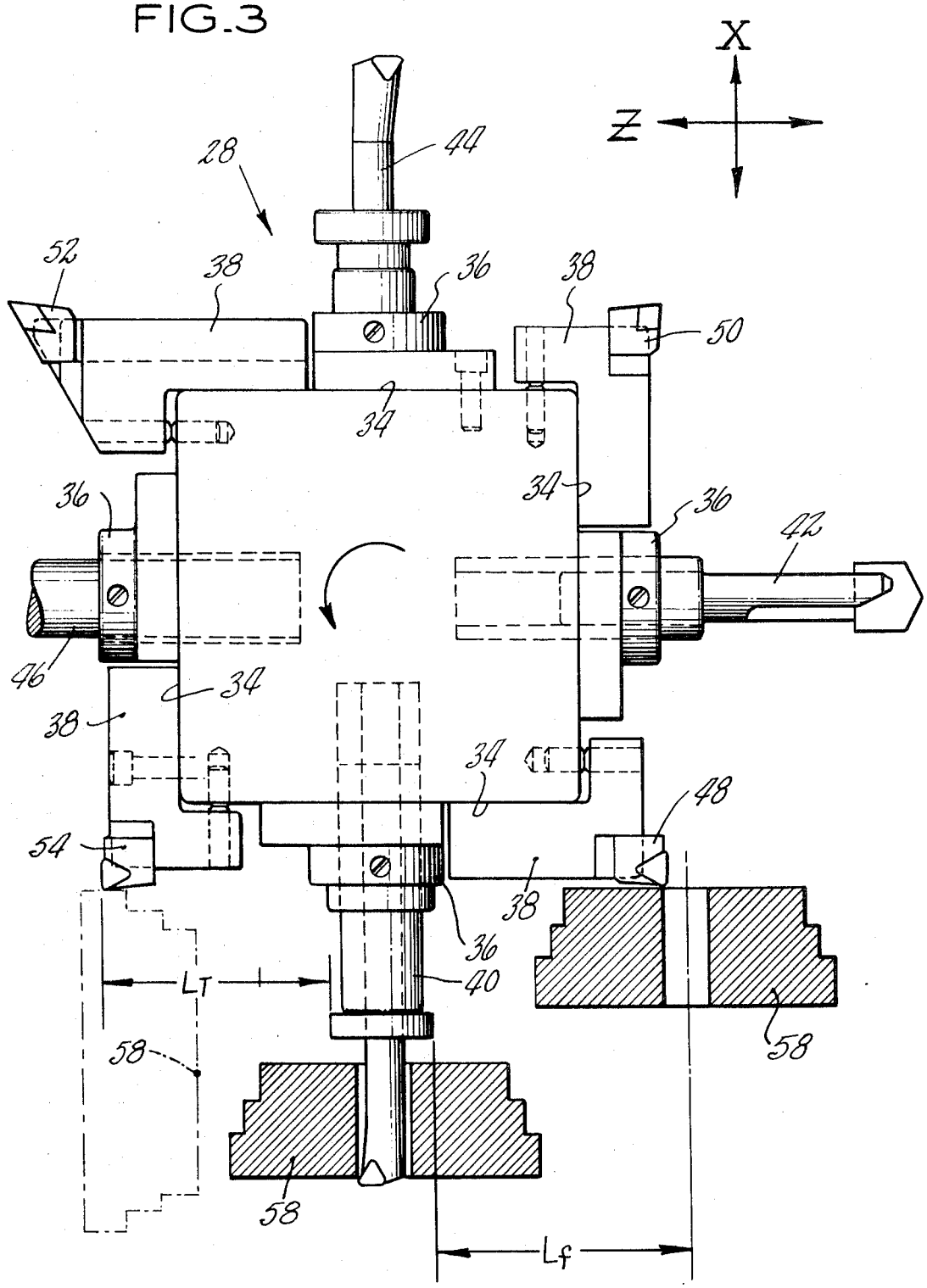

TURRET LATHE

BACKGROUND OF THE INVENTION

The present invention relates to turret lathes for metal turning, and more particularly concerns a two-axis turret lathe.

Turret lathes permit a number of machining operations to be performed in succession upon a workpiece without the necessity of removing the workpiece from the lathe's chuck. Typically, a plurality of circumferentially spaced tools are mounted around the periphery of the turret such that for each discrete angular position or index of the turret, a different machining operation may be completed. For example, a hexagonal turret, which is well-known in the prior art, is capable of accepting six different tools and is rotatable to six discrete positions for performing various machining operations. In the past, this type of turret has been employed with both numerically controlled (N/C) and manually controlled lathes. With a two-axis N/C lathe, one tool is positioned for cutting at optimum speeds and feeds without interference from other tools. Considering the hexagonal turret, it is manifest that if four boring tools are required, the turret can carry only two other type tools, such as turning or facing tools, thereby limiting the versatility of the lathe. Prior art turrets, including the hexagonal turret alluded to above, are characterized in that for each angular turret position, there is only one tool position, notwithstanding the fact that certain prior art turrets allow for the provision of two juxtaposed tools to cut simultaneously at each discrete turret position or index.

Lathe manufacturers have discovered that the turning of outside diameters on a workpiece is accomplished more efficiently with a crown-type turret mounted in perpendicular relationship to the hexagonal turret. For this reason, the many suppliers of combination machines either provide both type of turrets on one slide in two-axis machines, or both type of turrets on different slides in four-axis machines.

Also, many prior art engine lathes utilized a square turret, carrying four tools which extend from the tool block in parallel relationship to the respective faces upon which they are mounted. Such turrets simulate the performance of the aforementioned crown-type turret. Hence, for example, on a numerically controlled two-axis lathe incorporating a hexagonal turret and a crown turret, it is necessary to provide for control and interference of both turrets for the turning and boring machining operations. It would thus be highly desirable to have a turret which, for each turret index, yielded two distinct tool positions, since two distinct machining operations could be performed on the workpiece at one turret location, thereby simplifying the problem of turret control. Moreover, a single turret capable of performing two distinct machining operations is advantageous from the cost and manufacturing standpoints.

SUMMARY OF THE INVENTION

The invention solves the aforementioned problems by providing a turret with two tool holders positioned on each face and arranged in such a manner that one of the tool holders retains an ID tool perpendicular to the face of the turret, while the adjacent tool holder retains an OD tool parallel to the face of the turret. The turret of the invention is movable with respect to the lathe in longitudinal and transverse directions. The ID tools held perpendicular to the turret face are utilized for internal work, such as contouring, tapping and drilling of the workpiece, whereas, the OD tools, held parallel to the respective turret faces, are utilized for external contouring of the workpiece.

A turret according to the invention is believed unique in that it furnishes two distinct tool positions for each turret index. The mounting of the tools provides for optimum cutting conditions with respect to thrust and acceptance of standard commercial tools for internal machining of workpieces, and additionally provides optimum cutting conditions, clearances, and acceptance of standard commercial tools for external machining of workpieces. Hence, a turret in a lathe, according to the invention, performs the functions previously performed by both the hexagonal and crown turrets.

A lathe, according to the invention, offers the following advantages over previous usage.
1. Simplified lathe control and construction.
2. Each index, in which the turret is positionable, yields a total of two individual tool positions.
3. If the turret is generally square-shaped, for example, all of the advantages of the hexagonal turret are present for internal machining, with the additional advantage that less interference is encountered from boring tools on adjacent turret faces.
4. The turret of the invention furnishes all the advantages of the crown-type turret for turning and/or facing operations.

Accordingly, it is a primary object of the invention to provide a lathe having a turret capable of retaining tools which are adapted to perform both inside and outside work upon a workpiece.

It is another object of the invention to provide a lathe having a turret which is positionable in a plurality of discrete positions, and provides a total of two individual tool positions for each discrete position.

It is still another object of the invention to provide a lathe having a single turret which furnishes the advantages of the hexagonal turret with respect to internal machining operations and the advantages of the crown-type turret with respect to turning or facing operations.

These and other objects and advantages will become more readily apparent from the following detailed description taken in conjunction with the accompanying drawings.

BRIEF DESCRIPTION OF THE DRAWINGS

FIG. 3 is a plan view of the turret of the lathe of FIG. 1, showing the tool mounting arrangement.

DETAILED DESCRIPTION OF PREFERRED EMBODIMENT

Figure 1:
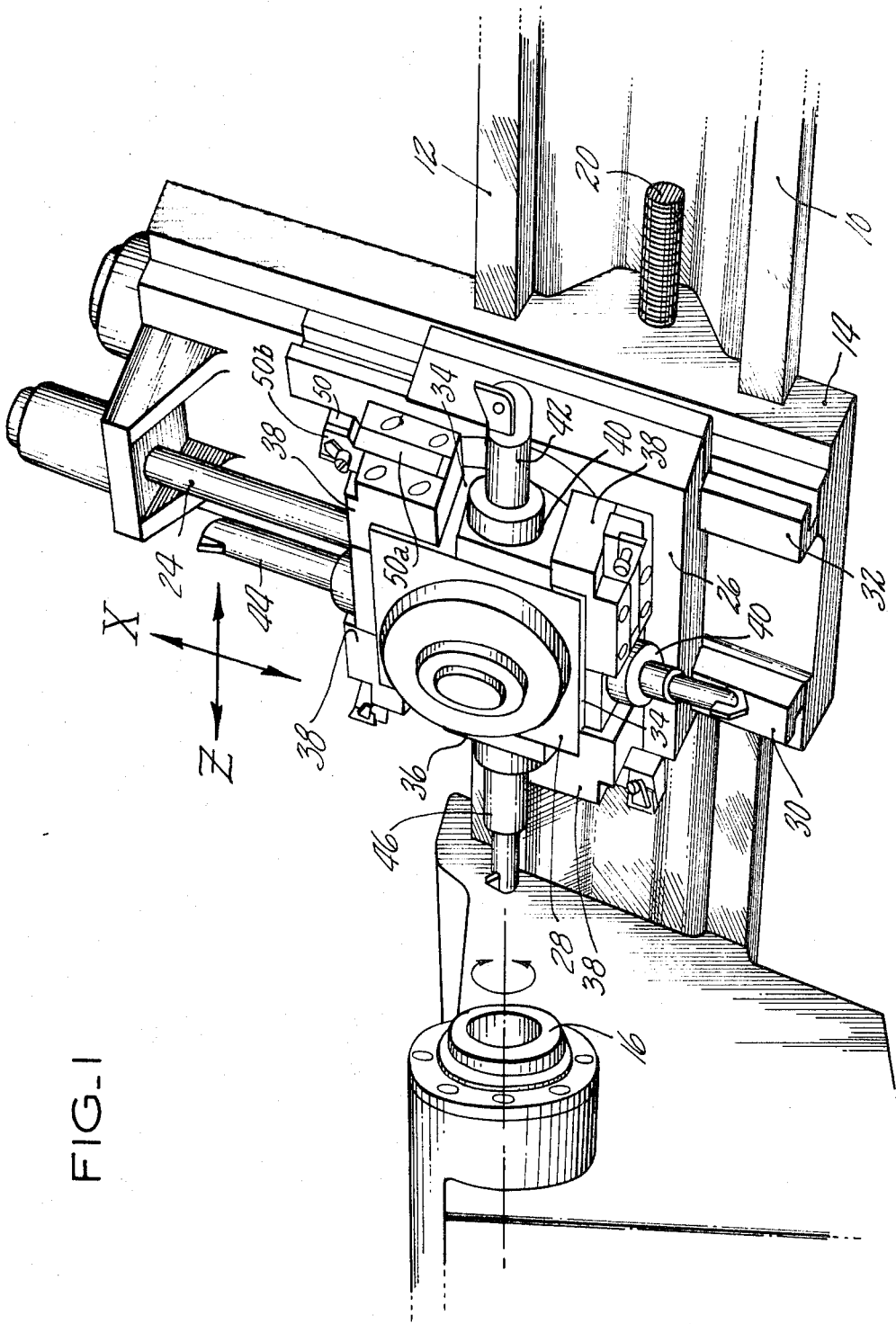
FIG. 1 is a fragmentary, perspective view of a lathe according to the invention.
Figure 2:
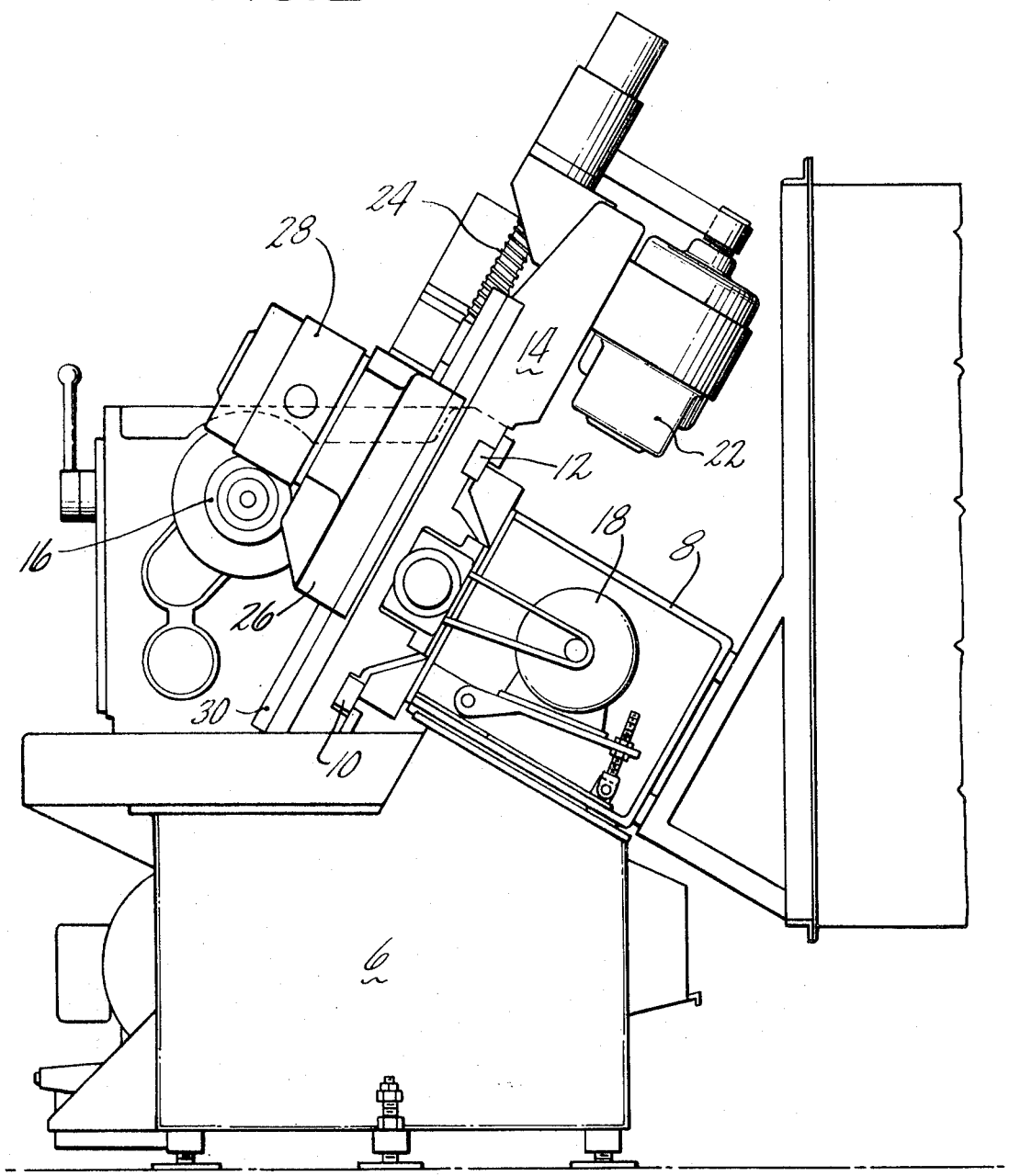
FIG. 2 is a rear elevational view of the lathe of FIG. 1.

Referring now to the drawings, and more particularly to FIGS. 1 and 2, there is shown a two-axis, slant bed, N/C (numerically controlled) lathe incorporating an embodiment of the invention. The lathe comprises a base 6 upon which is mounted a U-shaped bed 8. Attached to the bed 8 are two longitudinally extending rails or ways 10 and 12 disposed in parallel relationship to define a first track. A carriage 14 is mounted upon the rails 10 and 12 for longitudinal axial movement thereover toward and away from a chuck 16 which is driven by a spindle at the front end of the lathe. The carriage 14 is driven over the rails 10 and 12 by a servo motor 18 by means of a ball screw 20 in engagement with the carriage 14. Another servo motor 22 is mounted upon the carriage 14 for driving another ball screw 24. The ball screw 24 is connected to a cross slide 26, upon which a turret 28 is rotatably mounted. The cross slide is mounted for axial sliding movement upon rails or ways 30 and 32 which are, in turn, secured to the carriage 14 to define a second track. Hence, in addition to being rotatable with respect to the cross slide 26, the turret is movable along the longitudinal or Z axis, and another axis, designated X, which is perpendicular to the Z axis.

With particular reference to FIG. 1, it can be seen that the turret 28 is of square configuration in the illustrated embodiment. The turret 28 is mounted for rotation upon the cross slide 26 by suitable means (not shown) and is adapted to be rotatably positioned in four discrete or index positions by a suitable indexing mechanism (not shown). It will be noted that the rotation of the turret 28 is about an axis perpendicular to the cross slide 26. Each of the four index positions is respectfully spaced 90 degrees from the immediately preceding and the immediately succeeding positions.

Referring now to FIG. 1 in conjunction with FIG. 3, the turret 28 is shown as having four faces 34. To each of the faces 34 is secured a first tool holder 36 for retaining a round shank tool, in perpendicular thereto, to perform internal machining operations, and a second tool holder 38, for retaining a square shank tool, in parallel relationship thereto, to perform external machining operations. Hence, in the case of a square-shaped turret, four ID tools and four OD tools may be simultaneously retained.

Turning now to FIG. 3, four ID tools 40, 42, 44 and 46 are secured to the turret assembly 28 by the tool holders 36; and four OD tools 48, 50, 52 and 54 are secured to the turret assembly 28 by means of the tool holders 38. As shown in FIGS. 1 and 3, the shank of each OD tool is positioned between the tip thereof and the adjacent ID tool to which the shank is transverse; for example, the shank 50a of OD tool 50 is disposed between the tip 50b and the adjacent ID tool 42, the shank 50a being transverse to OD tool 42. The ID tools 40, 42, 44 and 46 may take the form of drills, boring bars, taps, recessing tools, etc., and can be utilized for internal cutting of the workpiece under optimum thrust conditions, thereby simulating the performance of conventional turret lathes. Contour machining, such as turning and facing, is performed by the OD tools 48, 50, 52 and 54. The OD tools allow for optimum external contouring of a workpiece since their use permits highly acceptable clearances. Thus, it will be appreciated that with respect to the tool holders and the tools retained therein, the turret assembly functions in a manner similar to that of conventional engine lathes and tracer lathes.

When using a turret lathe according to the invention, the dimensions of a workpiece, shown at 58, are subject to certain limitations when all eight tool positions are employed. These limitations are as follows: Obviously, the length of a turned diameter cannot exceed the indicated distance $L_t$, if interference is to be avoided between the workpiece 58 and tool 40. Moreover, the chuck's radius can not exceed the distance $L_f$ if interference is to be avoided between the chuck and the tool 40. Of course, it will be noted that the distance $L_f$ must exceed the chuck radius for clearances. These limitations, of course, are also applicable to the corresponding tools on the other faces. Also, it will be understood that the foregoing limitation upon the turning length $L_t$ is not applicable if the ID tool in the tool holder preceding the turning tool is omitted (for example, if OD tool 54 is assumed to be the turning tool, ID tool 40 is the tool in the preceding turret station). As is also apparent from FIG. 3, operations such as boring and drilling can easily be accomplished without undesirable interference with turning or facing tools mounted on the corners of the turret because of the inward locations thereof.

Hence, a lathe according to the invention provides for two distinct tool positions at each turret index. Also, the tool positions respectively furnish optimum operating conditions for each type of cutting tool.

In operation, the workpiece 58 is placed in the chuck 16, and the lathe subsequently started. The turret 28 will then be positioned successively in its four index positions. In each index position, the turret assembly 28 is positioned with respect to the X and Z axes to accomplish the programmed ID and OD machining operations without interference between the tools and the chuck or workpiece.

It will be noted that deviations of the turret geometry from that illustrated will not detract the benefits obtainable when utilizing the teachings herein.

From the foregoing, it will be seen that this invention provides an improved turret assembly which fulfills the several objects noted hereinabove.

I claim:

1. In a two-axis N/C lathe, the combination comprising:

a generally square-shaped turret, having a plurality of faces with corners defined therebetween, mounted on the lathe for movement in a first direction and a second direction transverse to the first direction, and rotation such that the turret may be rotated to a plurality of index positions;

a chuck mounted for rotation on the lathe for receiving a workpiece;

means to secure an ID tool on each face in perpendicular relationship thereto for internal machining of the workpiece;

means to secure an OD tool, having a shank and a tip, on each corner in parallel relationship with one of the adjacent faces such that the shank is located between the tip and the adjacent ID tool to which the shank is transverse so as to avoid interference with the workpiece during internal machining, and such that the tip is spaced from the adjacent ID tool a distance which is greater than the chuck radius so as to avoid interference between the chuck and the adjacent ID tool during external machining; and whereby the turret is positionable to provide two distinct and separate tool positions for each turret index for independent operation of each tool.

2. In a two-axis N/C lathe having a bed, the combination comprising:

a chuck mounted for rotation upon the lathe for receiving a workpiece;

a first track positioned on the bed and having an axis parallel to the axis of the chuck;

a carriage mounted on the first track for axial movement toward and away from the chuck;

a second track positioned on the carriage and having an axis transverse to the axis of the first track;

a cross slide mounted on the second track for axial movement therealong;

a generally square-shaped, indexing turret, having four faces which define four corners, mounted on the cross slide for rotation relative thereto between four index positions;

means on each face for mounting an ID tool perpendicular thereto for internal machining of the workpieces;

means on each corner for mounting an OD tool, having a shank and a tip, in parallel relationship with one of the adjacent faces such that the shank is located between the tip and the adjacent ID tool to which the shank is transverse so as to avoid interference with the workpiece during internal machining and such that the tip is spaced from the adjacent ID tool a distance which is greater than the chuck radius so as to avoid interference between the chuck and the adjacent ID tool during external machining; and whereby the turret is positionable to provide two distinct and separate tool positions for each turret index for independent operation of each tool.

3. The combination of claim 2, further including:

means to drive the carriage along the first track; and means to drive the cross slide along the second track.

* * * * *